US010862964B2

(12) United States Patent
Fix et al.

(10) Patent No.: US 10,862,964 B2
(45) Date of Patent: Dec. 8, 2020

(54) PEER PACKET TRANSPORT

(71) Applicant: AT&T Intellectual Property I, L.P., Atlanta, GA (US)

(72) Inventors: Jeremy T. Fix, Acworth, GA (US); Tung Nguyen, Norcross, GA (US); Sheldon Kent Meredith, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 115 days.

(21) Appl. No.: 16/133,957

(22) Filed: Sep. 18, 2018

(65) Prior Publication Data
US 2020/0092366 A1    Mar. 19, 2020

(51) Int. Cl.
| H04L 12/00 | (2006.01) |
| H04L 29/08 | (2006.01) |
| H04L 12/751 | (2013.01) |
| H04L 12/721 | (2013.01) |

(52) U.S. Cl.
CPC .......... H04L 67/1078 (2013.01); H04L 45/02 (2013.01); H04L 45/14 (2013.01)

(58) Field of Classification Search
CPC ...... H04L 45/02; H04L 45/14; H04L 67/1078
USPC ................................................. 709/238–241
See application file for complete search history.

(56) References Cited

U.S. PATENT DOCUMENTS

| 6,643,588 | B1 * | 11/2003 | Ibrahim | B60W 30/16 701/301 |
| 7,002,973 | B2 * | 2/2006 | MeLampy | H04L 29/06027 370/392 |
| 7,813,327 | B2 * | 10/2010 | LoGalbo | H04L 65/4046 370/338 |
| 7,843,930 | B2 * | 11/2010 | Mattes | H04L 47/12 370/392 |
| 7,953,544 | B2 * | 5/2011 | Amemiya | G08G 1/0104 340/995.13 |
| 7,995,476 | B2 * | 8/2011 | Lou | H04L 47/283 370/232 |
| 8,248,942 | B2 * | 8/2012 | Wing | H04L 43/065 370/235 |
| 8,340,690 | B2 | 12/2012 | Wong et al. | |
| 8,416,763 | B1 * | 4/2013 | Montini | H04J 3/0667 370/350 |
| 8,712,726 | B2 * | 4/2014 | Li | G05B 23/0283 702/179 |

(Continued)

*Primary Examiner* — Frantz Coby
(74) *Attorney, Agent, or Firm* — Hartman & Citrin LLC

(57) ABSTRACT

The concepts and technologies disclosed herein are directed to peer packet transport. According to one aspect disclosed herein, a scheduler system can receive a content delivery request to transport a data payload of content to a destination location by a specific time. A prediction system can identify a data path that meets connectivity between an origin location and the destination location with delivery of the data payload of content by the specific time. The prediction system can inform the scheduler system of the data path that meets connectivity between the origin location and the destination location with delivery of the data payload of content by the specific time. The scheduler system can coordinate, among a plurality of data courier devices, transport, along the data path, of the data payload of the content from the origin location to the destination location by the specific time.

20 Claims, 13 Drawing Sheets

(56) References Cited

U.S. PATENT DOCUMENTS

| | | | |
|---|---|---|---|
| 8,856,584 B2* | 10/2014 | Matsubara | H04L 45/22 |
| | | | 370/217 |
| 9,286,793 B2* | 3/2016 | Pan | G08G 1/00 |
| 9,451,517 B2* | 9/2016 | Harrang | H04W 36/22 |
| 9,584,843 B2 | 2/2017 | Christensen et al. | |
| 9,628,591 B2* | 4/2017 | Dharmavaram | H04L 69/03 |
| 9,667,542 B2* | 5/2017 | Sella | H04L 41/0654 |
| 9,699,592 B2 | 7/2017 | El Khayat et al. | |
| 9,736,651 B2 | 8/2017 | Chen et al. | |
| 9,866,602 B2 | 1/2018 | Tash et al. | |
| 2003/0172153 A1* | 9/2003 | Vaver | H04L 41/0681 |
| | | | 709/224 |
| 2003/0188010 A1* | 10/2003 | Raza | H04L 67/303 |
| | | | 709/238 |
| 2004/0220950 A1* | 11/2004 | Okamoto | G06F 11/348 |
| 2008/0069032 A1* | 3/2008 | Liu | H04W 24/06 |
| | | | 370/328 |
| 2008/0109678 A1* | 5/2008 | Wohlganger | G06Q 10/08 |
| | | | 714/37 |
| 2008/0137546 A1* | 6/2008 | Boyd | H04L 45/12 |
| | | | 370/252 |
| 2014/0280747 A1 | 9/2014 | Johns et al. | |
| 2015/0156280 A1 | 6/2015 | Vaswani et al. | |
| 2016/0344791 A1 | 11/2016 | Veit et al. | |
| 2017/0149882 A1 | 5/2017 | Roy | |

* cited by examiner

PEER PACKET TRANSPORT

BACKGROUND

Today's packet networks are responsible for transferring large amounts of data over limited fixed bandwidth connections. Web browsing, music streaming, video streaming, media downloads, online gaming, and the like are becoming increasingly popular on devices such as smartphones, tablets, streaming devices, smart televisions, video game consoles, and other network-connected consumer electronics devices. Moreover, as the quality of media increases (e.g., the transition from 1080P resolution video to 4K resolution video), the data requirements to transfer the media also increase. For these reasons, network service providers are looking for ways to increase the size and speed of data pipes and to utilize more sophisticated data handling techniques for moving larger amounts of data within existing data pipes.

SUMMARY

Concepts and technologies disclosed herein are directed to peer packet transport. According to one aspect of the concepts and technologies disclosed herein, a scheduler system can receive a content delivery request to transport a data payload of content to a destination location by a specific time. A prediction system can identify a data path that meets connectivity between an origin location and the destination location with delivery of the data payload of content by the specific time. The prediction system can inform the scheduler system of the data path that meets connectivity between the origin location and the destination location with delivery of the data payload of content by the specific time. The scheduler system can coordinate, among a plurality of data courier devices, transport, along the data path, of the data payload of content from the origin location to the destination location by the specific time. The content delivery request can originate from a content requester and the data payload of content can be sourced from a content provider.

In some embodiments, the data path can include a plurality of locations. The plurality of locations can include the origin location and the destination location. In some embodiments, in a location of the plurality of locations, the data payload of the content can be transferred between a first entity and a second entity.

In some embodiments, the first entity can include a first data courier device of the plurality of data courier devices, and the second entity can include a second data courier device of the plurality of data courier devices. In some embodiments, the first entity can include the content provider, and the second entity can include a data courier device of the plurality of data courier devices. In some embodiments, the first entity can include a data courier device of the plurality of data courier devices, and the second entity can include the content requester. In some embodiments, the first entity can include a content hub, and the second entity can include a public transport device. In some embodiments, the first entity can include a content hub, and the second entity can include a data courier device of the plurality of data courier devices.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
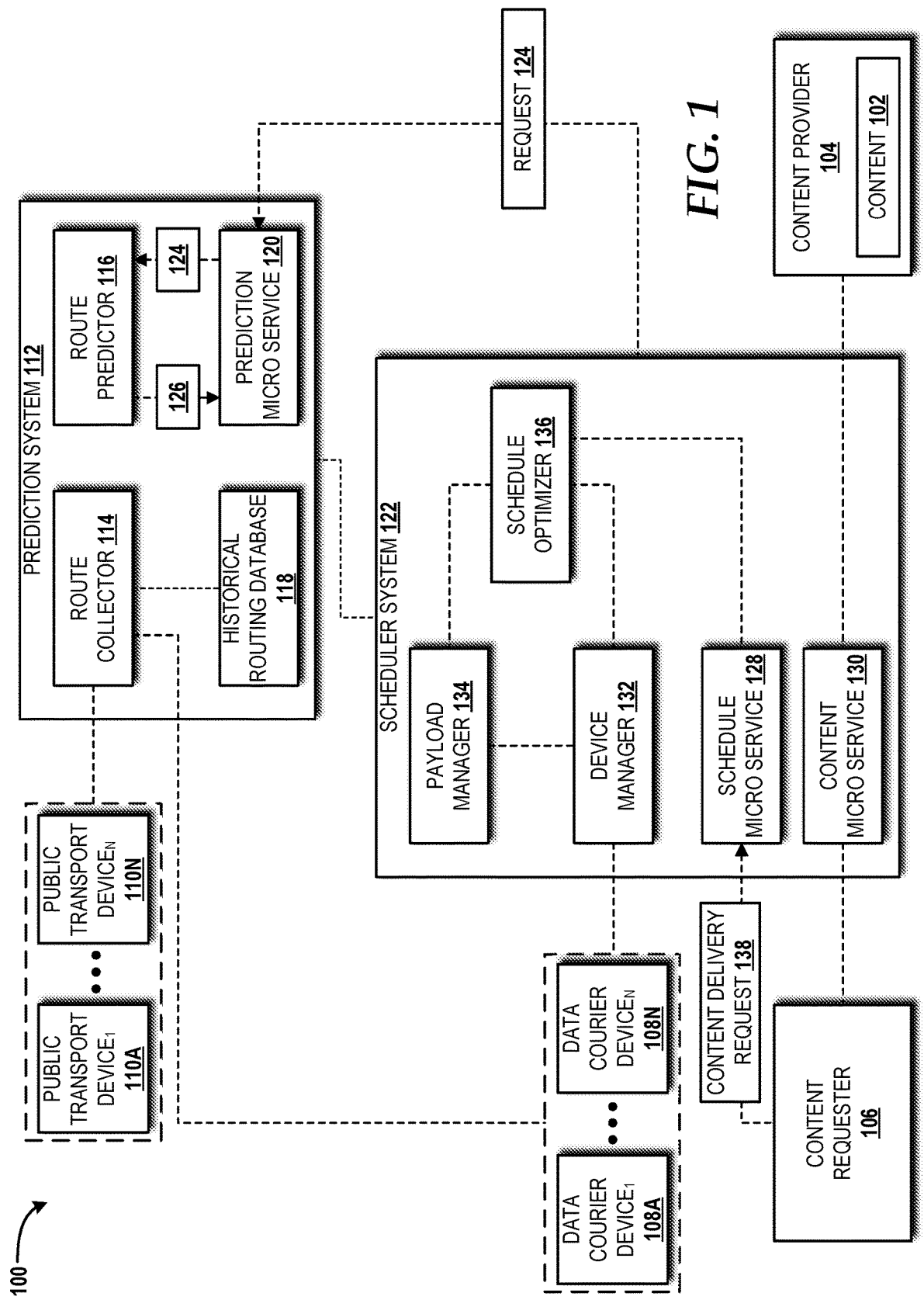
FIG. 1 is a block diagram illustrating an operating environment in which embodiments of the concepts and technologies disclosed herein can be implemented.

Turning now to FIG. 1, a block diagram illustrating an operating environment 100 in which aspects of the concepts and technologies disclosed herein can be implemented will be described. According to one aspect, the concepts and technologies disclosed herein provide a novel solution for moving data associated with content 102 from a content provider 104 to a content requester 106 by leveraging one or more data courier devices 108A-108N (hereinafter, at times, referred to collectively as data courier devices 108 or in the singular as data courier device 108) and/or one or more public transport devices 110A-110N (hereinafter, at times, referred to collectively as public transport devices 110 or in the singular as public transport device 110) associated with one or more public transportation services.

The content 102 can include, in any combination, text, image, audio, video, documents, application software, operating system software, portions thereof, and the like. The concepts and technologies disclosed herein can be particularly useful for delivering data payloads such as large downloads of video or software that are not sensitive to latency and other network phenomena.

The content requester 106 includes at least one entity that can request at least a portion of the content 102 from the content provider 104. The content requester 106, in some embodiments, can be or can include one or more systems and/or one or more devices associated with one or more users, one or more businesses, one or more households, one or more data backup providers, one or more data exchange shippers, one or more other entities, and/or one or more services. In particular, the content requester 106 can be or can include any device, system, smartphone, feature phone, personal digital assistant ("PDA"), tablet device, laptop computer, desktop computer, server computer, video game system, handheld video game system, media player, set-top box, vehicle computing system, watch, television, consumer electronic device, personal tracker or safety device, "smart" device, other computing system or device, a combination thereof, or the like. It should be understood that the functionality of the content requester 106 can be provided by a single system/device, by two or more similar systems/devices, and/or by two or more dissimilar systems/devices.

The content provider 104 includes at least one entity that provides the content 102 to any content requester(s), such as the content requester 106. In some embodiments, the content provider 104 provides the content 102 to the content requester 106 in accordance with a service model, such as free, paid, or subscription-based service model. The content provider 104 can be or can include one or more systems and/or one or more devices associated with one or more users, one or more businesses, one or more other entities, one or more content marketplaces, one or more websites, one or more retail stores, one or more online stores, one or more services, and/or the like. In particular, the content provider 104 can be or can include any device, system, smartphone, feature phone, PDA, tablet device, laptop computer, desktop computer, server computer, video game system, handheld video game system, media player, set-top box, vehicle computing system, watch, television, consumer electronic device, personal tracker or safety device, "smart" device, other computing system or device, a combination thereof, or the like. It should be understood that the functionality of the content requester 106 can be provided by a single system/device, by two or more similar systems/devices, and/or by two or more dissimilar systems/devices. Those skilled in the art will appreciate the diversity of content distribution models that can be implemented by a given content provider, and as such, the examples provided herein are merely exemplary and should not be construed as being limiting in any way.

The data courier devices 108A-108N can be or can include one or more mobile systems and/or one or more mobile devices capable of storing, in memory or other storage media, the content 102, and physically transporting the content 102 at least a portion of a distance between a first location and a second location. The public transport devices 110A-110N can be or can include one or more fixed systems and/or one or more fixed devices associated with one or more public transportation services and can be capable of storing, in memory or other storage media, the content 102, and physically transporting the content 102 at least a portion of a distance from the content provider 104 to the content requester 106. The public transport devices 110 can be associated with public transportation services, such as, for example, buses, trains, rapid transit, ferries, airplanes, taxis, combinations thereof, and/or the like.

In some embodiments, a single data courier device 108 transports the content 102 from an origin location in which the data courier device 108 receives the content 102 from the content provider 104 to a destination location in which the data courier device 108 provides the content 102 to the content requester 106. In some embodiments, multiple data courier devices 108 transport the content 102 from the origin location to the destination location, with handoffs of the content 102 between data courier devices 108 along a route from the origin location to the destination location. In some embodiments, a single public transport device 110 transports the content 102 from an origin location in which the public transport device 110 receives the content 102 from the content provider 104 to a destination location in which the public transport device 110 provides the content 102 to the content requester 106. In another embodiment, multiple public transport devices 110 transport the content 102 from the origin location to the destination location, with handoffs of the content 102 between public transport devices 110 along a route from the origin location to the destination location. In some embodiments, transport of the content 102 from one location to another can be handled by a combination of one or more data courier devices 108 and one or more public transport devices 110.

The content 102 can be transferred from one entity to another (e.g., a content provider 104 to a data courier device 108; a content provider 104 to a public transport device 110; a data courier device 108 to another data courier device 108; a data courier device 108 to a public transport device 110, or vice versa; a public transport device 110 to another public transport device 110; or a data courier device 108 or a public transport device 110 to a content requester 106) via a wired or wireless connection. The connection can be a direct connection between two entities, such as, for example, USB connection, Ethernet connection, BLUETOOTH connection, WI-FI direct, or the like. The connection can be established over one or more networks, such as, for example, a WI-FI network, a cellular network, an Ethernet network, an ad-hoc network, or the like. The connection can be an unsecure connection or a secure connection. Other security mechanisms can be used to transfer the content 102 from one entity to another. Those skilled in the art will appreciate the numerous secure transmission methods and data encryption methods can be used alone or in any combination to ensure the content 102 is transferred securely from one entity to another.

The operating environment 100 also includes a prediction system 112 that, in turn, includes a route collector 114, a route predictor 116, a historical routing database 118, and a prediction micro service 120. The route collector 114 collects location data from the data courier devices 108 and the public transport devices 110. In some embodiments, the route collector 114 is implemented as a micro service that receives location updates from the data courier devices 108 and the public transport devices 110 and stores the location updates in association therewith in the historical routing database 118. The route predictor 116 predicts the probability that the data courier devices 108 and the public transport devices 110 will be at a specific location at a specific time using historical routing information based upon location updates collected by the route collector 114 and stored in the historical routing database 118. The prediction micro service 120 functions as an end point for the prediction system 112 and one or more external prediction requesters. In the illustrated embodiment, the prediction micro service 120 functions as an end point for a scheduler system 122. The prediction micro service 120 allows external requesters, such as the scheduler system 122, to perform search functions that trigger the route predictor 116 to formulate a response. A use case is provided below for clarity.

The scheduler system 122 solicits the prediction micro service 120 by sending a request 124 for a list of one or more devices that meet criteria, including one or more conditions. Within the request 124, the scheduler system 122 can identify the criteria that each device in the list must meet. For example, one condition might restrict the list to one or more devices at location A between times $T_1$ and $T_2$; another condition might restrict the list to one or more devices at location B between times $T_3$ and $T_4$, and yet another condition might restrict the list to one or more devices that meet both the first and second conditions with a probability of greater than a certain percentage. The prediction micro service 120 translates the request 124 into search functions that trigger the route predictor 116 to formulate a response 126 to the request 124. The response 126 includes the list of one or more devices and a probability score for each device that defines the probability that a particular device will meet each condition specified in the request 124. Extending the example above, the response 126 can identify a first device having a 92% probability of meeting the first condition and an 85% probability of meeting the second condition; a second device having a 90% probability of meeting the first condition and an 87% probability of meeting the second condition; and an $n^{th}$ device having a 94% probability of meeting the first condition and a 94% probability of meeting the second condition.

The illustrated scheduler system 122 includes a schedule micro service 128, a content micro service 130, a device manager 132, a payload manager 134, and a schedule optimizer 136. The schedule micro service 128 handles all content delivery requests 138 directed to the scheduler system 122 from outside the system, such as from the content requester 106. The content requester 106 can identify, in the content delivery request 138, the content 102 needed, a location in which to deliver the content 102, and a specific time or time range for the delivery.

The content micro service 130 handles all the content 102 available from the content provider(s) 106 through a publishing service, whereby the content provider(s) 106 can publish the availability of the content 102. The content micro service 130 also makes available metadata about the content 102 to the content requester(s) 104 so the content requester(s) 104 can reference the specific content in the content delivery requests 138.

The device manager 132 manages the status of all devices available as data couriers, including the data courier devices 108A-108N and the public transport devices 110A-110N, and maintains corresponding device identifiers for use in identifying particular device(s) within prediction requests (e.g., the request 124) to the prediction micro service 120, content delivery requests 138 from the content requester(s) 106, and other courier accounting information such as the current state of transport of a given data payload, amount of data in the data payload, and time to delivery/offload for the data payload. An identifier for each new data payload is added to the device manager 132 for each device involved in the delivery of the data payload, and is removed/expired once the data payload is delivered.

The payload manager 134 accounts for all data payloads of the content 102, including identification of the current data couriers handling the data payloads, the public and private keys (or other security mechanisms) exchanged for the data payload, the intended routes for the data payloads, and the intended delivery times for the data payloads. The payload manager 134 communicates with the device manager 132 to assess when certain data payloads are at risk (e.g., at risk of not being delivered by the intended delivery time), and informs the schedule optimizer 136 of a need to reassess the current delivery schedule as needed.

The prediction system 112 and the scheduler system 122, in the illustrated embodiment, are provided by two separate systems. In other embodiments, the prediction system 112 and the scheduler system 122 can be combined into a single system. Moreover, each component of the prediction system 112 and the scheduler system 122 is illustrated as a distinct component, although the functionality thereof can be combined in any way.

Figure 2:
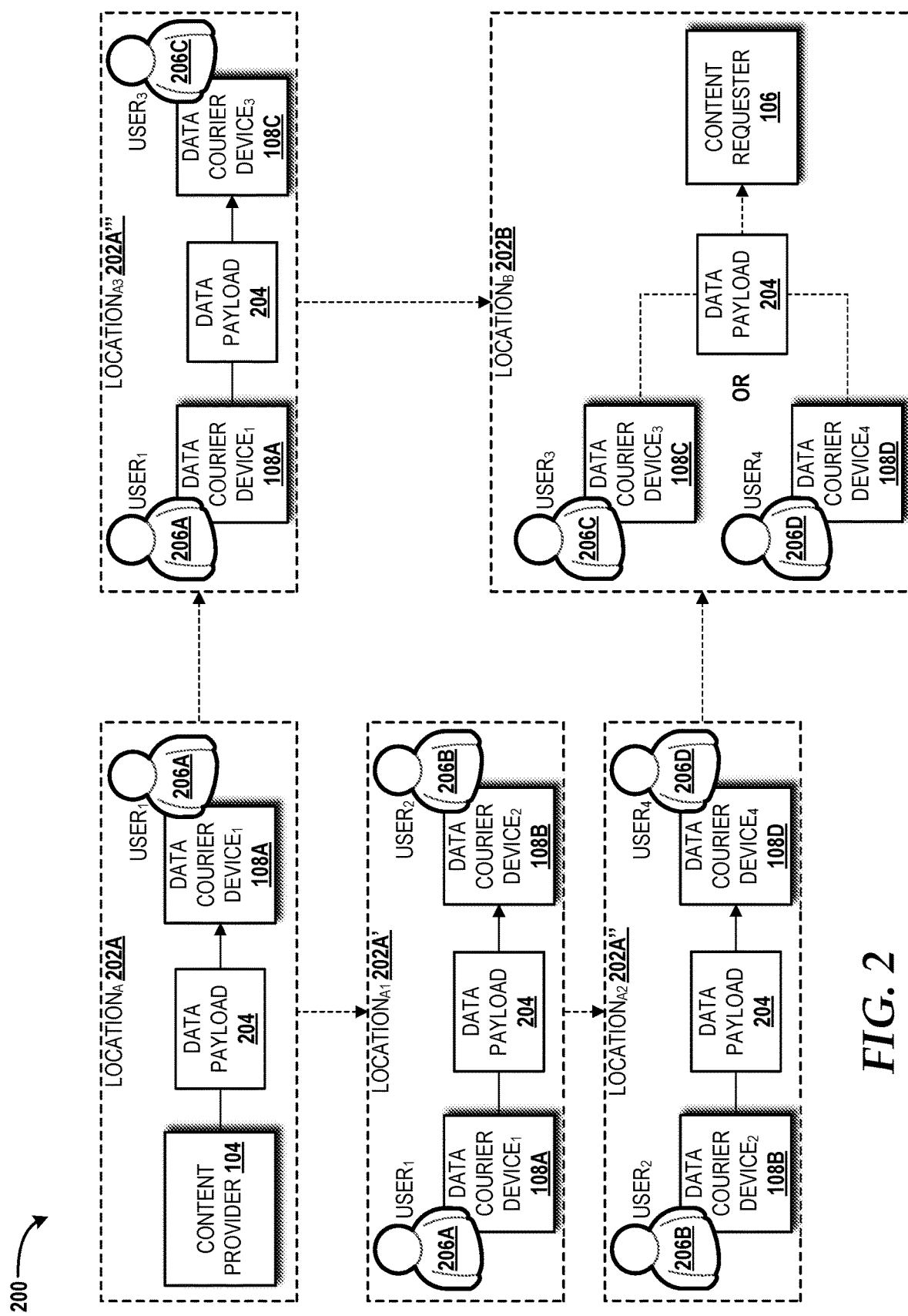
FIG. 2 is a block diagram illustrating an example use case of peer packet transport using a multi-path full mobile transfer scheme, according to an illustrative embodiment of the concepts and technologies disclosed herein.

Turning now to FIG. 2, a block diagram illustrating an example use case of peer packet transport using a multi-path full mobile transfer scheme 200 will be described, according to an illustrative embodiment of the concepts and technologies disclosed herein. In the illustrated example, the multi-path full mobile transfer scheme 200 includes location$_A$ 202A, locational 202A', location 202A", location$_{A3}$ 202A''', and location$_B$ 202B. The illustrated multi-path full mobile transfer scheme 200 assumes the scheduler system 122 (FIG. 1) has received a content delivery request 138 from the content requester 106 to transfer a data payload 204 of the content 102 (FIG. 1) to the location$_B$ 202B by time T. In response to the content delivery request 138, the scheduler system 122 coordinates with the prediction system 112 to determine one or more data paths that meet connectivity between the location$_A$ 202A and the location$_B$ 202B with delivery by time T. In the illustrated example, the scheduler system 122 and the prediction system 112 coordinate to determine two data paths that meet connectivity between the content provider 104 in the location$_A$ 202A and the content requester 106 in the location$_B$ 202B with delivery by time T.

A first example data path that meets connectivity between the location$_A$ 202A and the location$_B$ 202B with delivery by time T will now be described. In the location$_A$ 202A, the content provider 104 provides the data payload 204 of the content 102 to the data courier device$_1$ 108A associated with a user$_1$ 206A. The data courier device$_1$ 108A stores the data payload 204. The user$_1$ 206A then travels with the data courier devices 108A to the location$_{A1}$ 202A', where the data courier device$_1$ 108A and the data courier device$_2$ 108B establish a connection over which the data courier device$_1$ 108A transfers the data payload 204 to the data courier device$_2$ 108B associated with a user$_2$ 206B. The data courier device$_2$ 108B stores the data payload 204. The user$_2$ 206B then travels with the data courier device$_2$ 108B to the location 202A", where the data courier device$_2$ 108B and the data courier device$_4$ 108D establish a connection over which the data courier device$_2$ 108B transfers the data payload 204 to the data courier device$_4$ 108D associated with a user$_4$ 206D. The data courier device$_4$ 108D stores the data payload 204. The user$_4$ 206D then travels with the data courier device$_4$ 108D to the location$_B$ 202B, where the data courier device$_4$ 108D and the content requester 106 establish a connection over which the data courier device$_4$ 108D transfers the data payload 204 to the content requester 106.

A second example data path that meets connectivity between the location$_A$ 202A and the location$_B$ 202B with delivery by time T will now be described. In the location$_A$ 202A, the content provider 104 provides the data payload 204 of the content 102 to the data courier device$_1$ 108A associated with a user$_1$ 206A. The data courier device$_1$ 108A stores the data payload 204. The user$_1$ 206A then travels with the data courier device$_1$ 108A to the location$_{A3}$ 202A''', where the data courier device$_1$ 108A and the data courier device$_3$ 108C establish a connection over which the data courier device$_1$ 108A transfers the data payload 204 to the data courier device$_3$ 108C associated with a user$_3$ 206C. The data courier device$_3$ 108C stores the data payload 204. The user$_3$ 206C then travels with the data courier device$_3$ 108C to the location$_B$ 202B, where the data courier device$_3$ 108C and the content requester 106 establish a connection over which the data courier device$_3$ 108C transfers the data payload 204 to the content requester 106.

Figure 3:
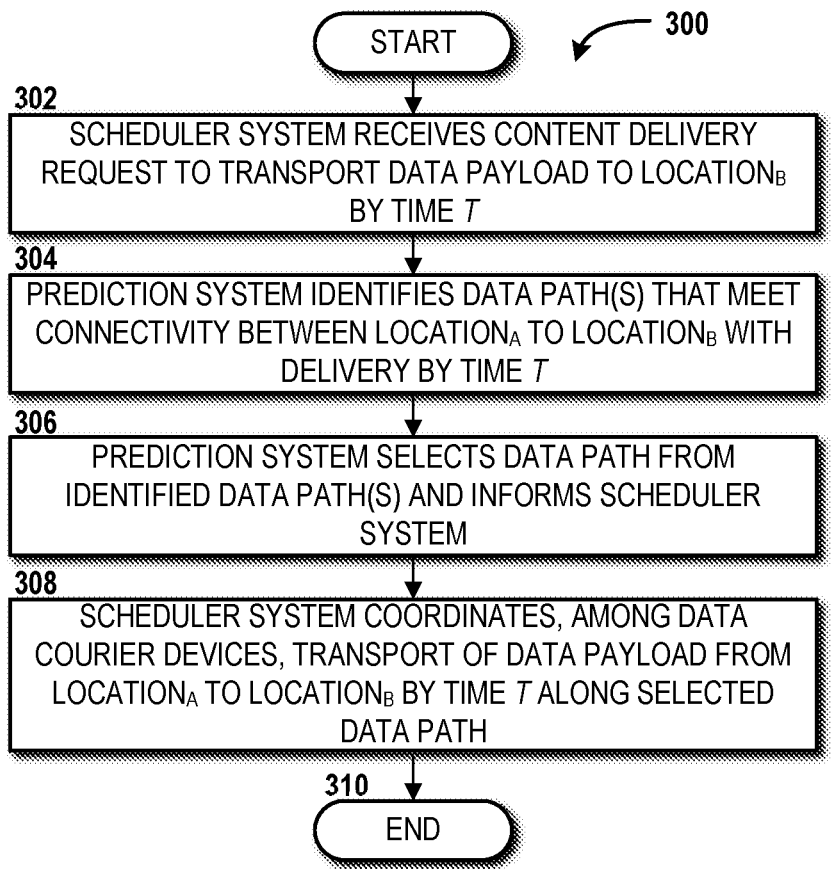
FIG. 3 is a flow diagram illustrating aspects of a method for implementing a peer packet transport service, according to an illustrative embodiment of the concepts and technologies disclosed herein.

Turning now to FIG. 3, aspects of a method 300 for implementing a peer packet transport service via data courier devices 108 will be described, according to an illustrative embodiment of the concepts and technologies disclosed herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, servers, routers, switches, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor or other processing component(s) disclosed herein to perform operations. It should be understood that the performance of one or more operations may include operations executed by one or more virtual processors at the instructions of one or more of the aforementioned hardware processors.

The method 300 will be described with reference to FIG. 3 and further reference to FIGS. 1 and 2. The method 300 begins and proceeds to operation 302, where the scheduler system 122 receives the content delivery request 138 from the content requester 106 to transport the data payload 204 to the location$_B$ 202B by time T. From operation 302, the method 300 proceeds to operation 304, where the prediction system 112 identifies the data path(s) that meet connectivity between location$_A$ 202A to location$_B$ 202B by time T From operation 304, the method 300 proceeds to operation 306, where the prediction system 112 selects a data path from the data path(s) identified at operation 304. In the example shown in FIG. 2, the prediction system 112 has identified two data paths from which the prediction system 112 can select for fulfilling the content delivery request 138. From operation 306, the method 300 proceeds to operation 308, where the scheduler system 122 coordinates, among the data courier devices 108, transport of the data payload 204 from the location$_A$ 202A to location$_B$ 202B by time T along the data path selected at operation 306. From operation 308, the method 300 proceeds to operation 310, where the method 300 ends.

Figure 4:
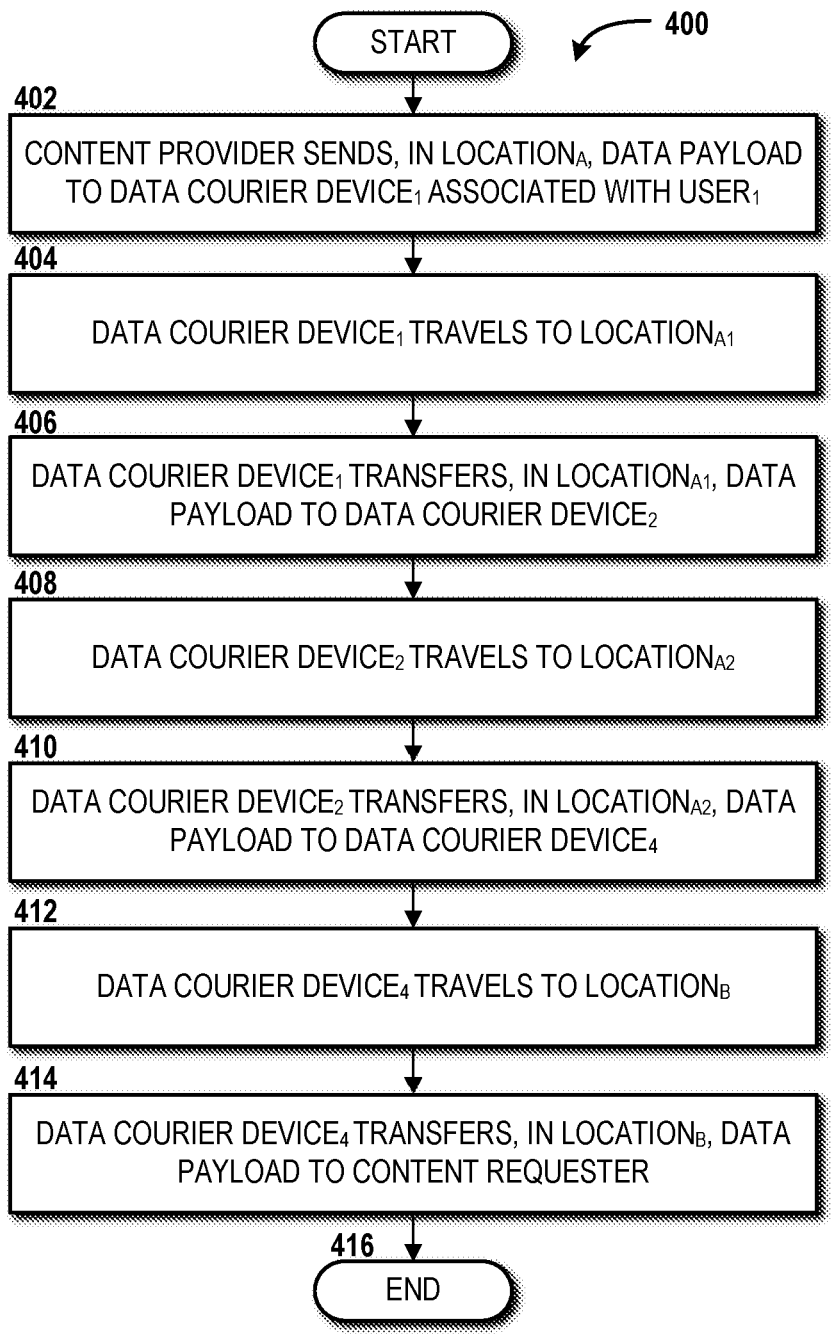
FIG. 4 is a flow diagram illustrating aspects of a method for implementing a peer packet transport service to transport a data payload using a first example data path shown in the multi-path full mobile transfer scheme of FIG. 2, according to an illustrative embodiment of the concepts and technologies disclosed herein.

Turning now to FIG. 4, a method 400 for implementing a peer packet transport service to transport the data payload 204 using the first example data path shown in the multi-path full mobile transfer scheme 200 of FIG. 2 will be described, according to an illustrative embodiment. The method 400 will be described with reference to FIG. 4 and further reference to FIG. 2. The method 400 begins and proceeds to operation 402, where the content provider 104 sends, in the location$_A$ 202A, the data payload 204 to the data courier device$_1$ 108A associated with the users 206A. From operation 402, the method 400 proceeds to 404, where the data courier device$_1$ 108A travels to the location$_{A1}$ 202A'. From operation 404, the method 400 proceeds to operation 406, where the data courier device$_1$ 108A transfers, in the location$_{A1}$ 202A', the data payload 204 to the data courier device$_2$ 108B. From operation 406, the method 400 proceeds to operation 408, where the data courier device$_2$ 108B travels to the locations 202A". From operation 408, the method 400 proceeds to operation 410, where the data courier devices 108B transfers, in location 202A'', the data payload 204 to the data courier device$_4$ 108D. From operation 410, the method 400 proceeds to operation 412, where the data courier device$_4$ 108D travels to the location$_B$ 202B. From operation 412, the method 400 proceeds to operation 414, where the data courier device$_4$ 108D transfers the data payload 204 to the content requester 106. From operation 414, the method 400 proceeds to operation 416, where the method 400 ends.

Figure 5:
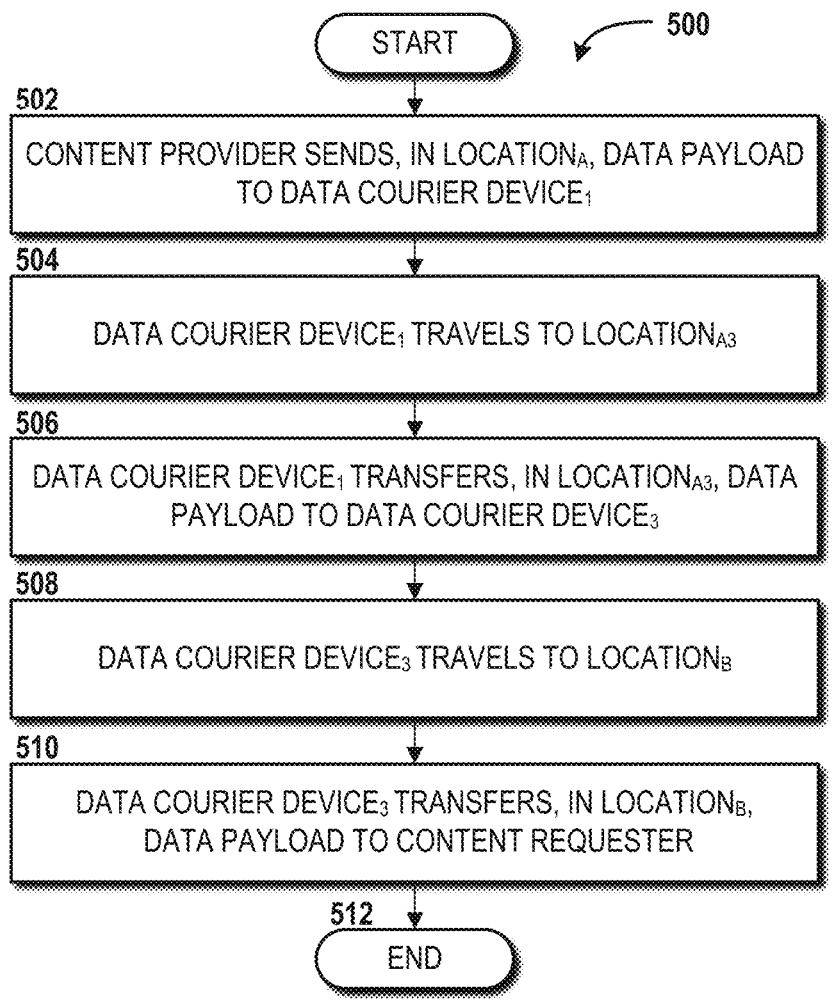
FIG. 5 is a flow diagram illustrating aspects of a method for implementing a peer packet transport service to transport a data payload using a second example data path shown in the multi-path full mobile transfer scheme of FIG. 2, according to an illustrative embodiment of the concepts and technologies disclosed herein.

Turning now to FIG. 5, a method 500 for implementing a peer packet transport service to transport the data payload 204 using the second example data path shown in the multi-path full mobile transfer scheme 200 of FIG. 2 will be described, according to an illustrative embodiment. The method 500 will be described with reference to FIG. 5 and further reference to FIG. 2. The method 500 begins and proceeds to operation 502, where the content provider 104 sends, in the location$_A$ 202A, the data payload 204 to the data courier devices 108A. From operation 502, the method 500 proceeds to operation 504, where the data courier device$_1$ 108A travels to the location$_{A3}$ 202A'''. From operation 504, the method 500 proceeds to operation 506, where the data courier device$_1$ 108A transfers, in the location$_A$ 202A''', the data payload 204 to the data courier device$_3$ 108C. From operation 506, the method 500 proceeds to operation 508, where the data courier device$_1$ 108A travels to the location$_B$ 202B. From operation 508, the method 500 proceeds to operation 510, where the data courier device$_3$ 108C transfers the data payload 204 to the content requester 106 at the location$_B$ 202B. From operation 510, the method 500 proceeds to operation 512, where the method 500 ends.

Figure 6:
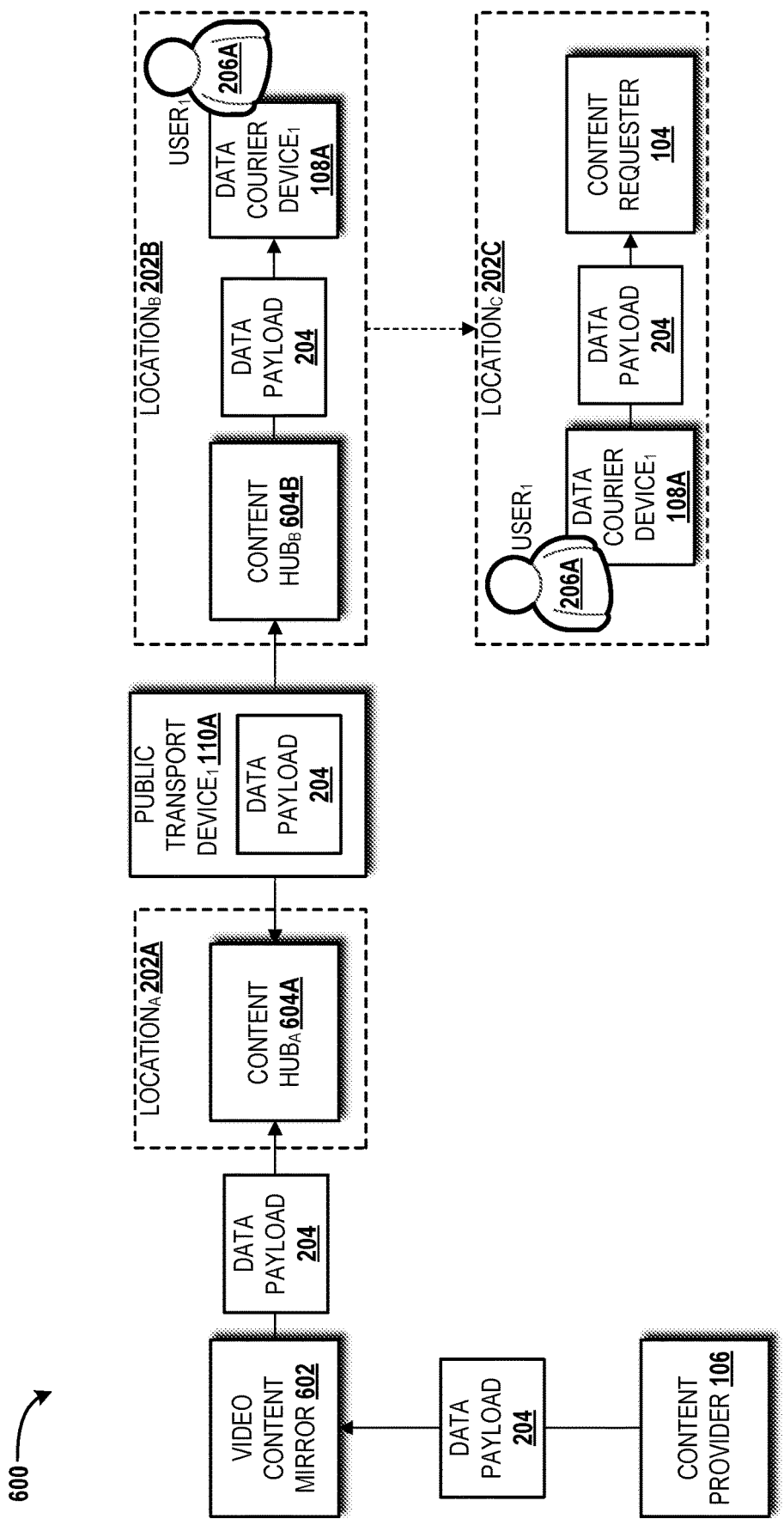
FIG. 6 is a block diagram illustrating an example use case of peer packet transport using a content hub transfer scheme, according to an illustrative embodiment of the concepts and technologies disclosed herein.

Turning now to FIG. 6, a block diagram illustrating an example use case of peer packet transport using a content hub transfer scheme 600 will be described, according to an illustrative embodiment of the concepts and technologies disclosed herein. FIG. 6 will be described with further reference to FIGS. 1 and 2. In the illustrated example, the content hub transfer scheme 600 includes the location$_A$ 202A and the location$_B$ 202B, both introduced in FIG. 2, and location$_C$ 202C. The illustrated content hub transfer scheme 600 assumes the scheduler system 122 (FIG. 1) has received the content delivery request 138 from the content requester 106 to transfer the data payload 204 of the content 102 (FIG. 1) to the location$_C$ 202C by time T. In response to the content delivery request 138, the scheduler system 122 coordinates with the prediction system 112 to determine one or more data paths that meet connectivity between the location$_A$ 202A and the location$_C$ 202C with delivery by time T.

In the illustrated example, the content provider 104 provides the data payload 204 of the content 102 to a video content mirror 602. Although a single video content mirror 602 is illustrated, some implementations can include multiple video content mirrors 602, which can be geographically distributed. The illustrated example focuses on video content, although other content types are contemplated.

In the illustrated example, the video content mirror 602 and a content hub$_A$ 604A establish a connection over which the video content mirror 602 provides the data payload 204 of the content 102 to a content hub$_A$ 604A at the location$_A$ 202A. The content hub$_A$ 604A stores the data payload 204. The content hub$_A$ 604A and the public transport device$_1$ 110A establish a connection over which the content hub$_A$ 604A provides the data payload 204 of the content 102 to the public transport device$_1$ 110A. The public transport device$_1$ 110A then travels from the location$_A$ 202A to the location$_B$ 202B, where the public transport device$_1$ 110A and the content hub$_B$ 604B establish a connection over which the public transport device$_1$ 110A transfers the data payload 204 to a content hub$_B$ 604B.

The data courier device$_1$ 108A associated with the user$_1$ 206A and the content hub$_B$ 604B establish a connection over which the content hub$_B$ 604B transfers the data payload 204 to the data courier device$_1$ 108A. The user$_1$ 206A then travels with the data courier device$_1$ 108A to the location$_C$ 202C, where the data courier device$_1$ 108A and the content requester 106 establish a connection over which the data courier device$_1$ 108A transfers the data payload 204 to the content requester 106.

Figure 7:
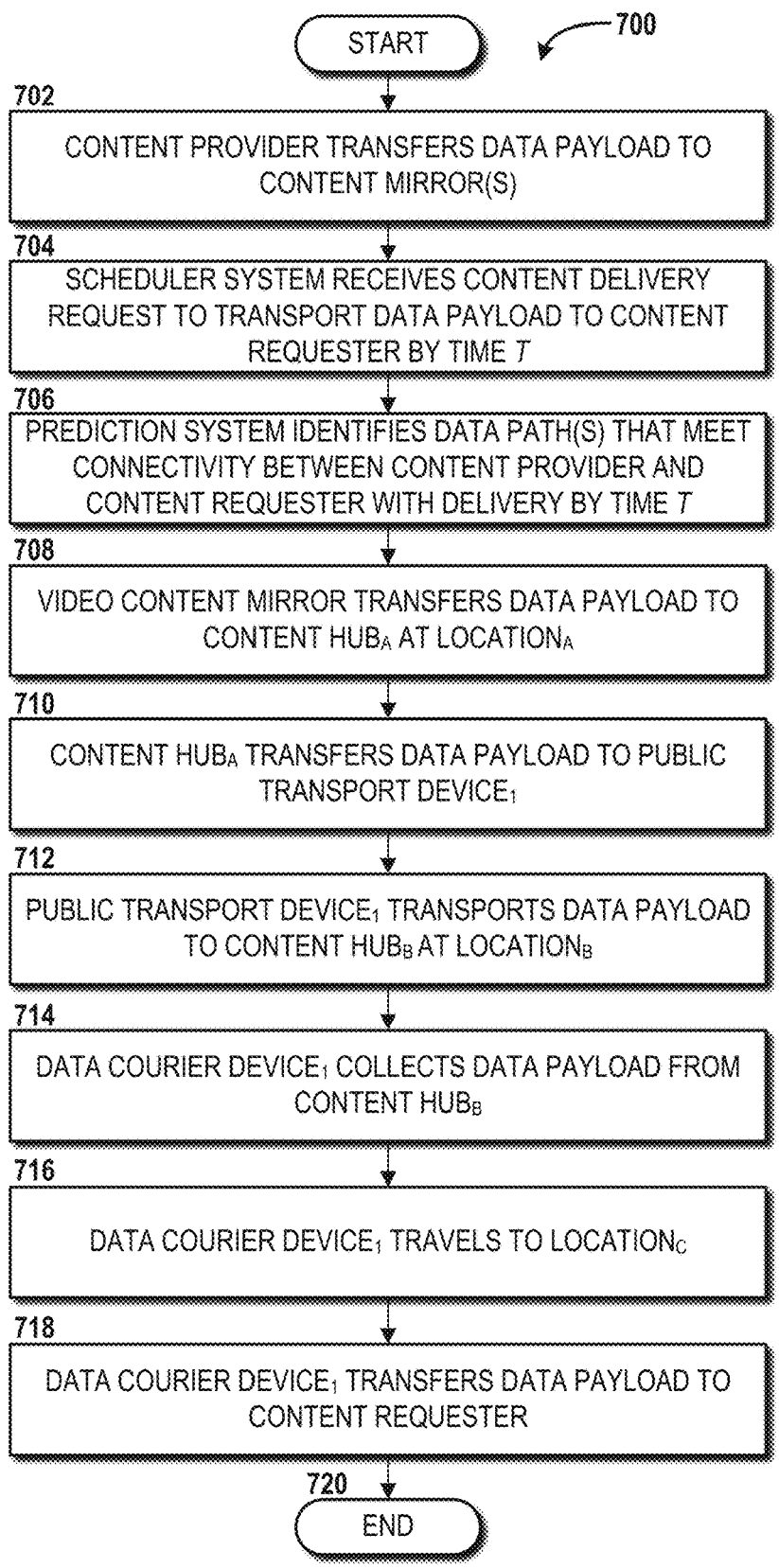
FIG. 7 is a flow diagram illustrating aspects of a method for implementing a peer packet transport service via a public transport device and a data courier device, according to an illustrative embodiment of the concepts and technologies disclosed herein.

Turning now to FIG. 7, a method 700 for implementing a peer packet transport service via the public transport device 110 and the data courier device$_1$ 108A will be described, according to an illustrative embodiment. The method 700 begins and proceeds to operation 702, where the content provider 104 transfers the data payload 204 to the video content mirror(s) 602. From operation 702, the method 700 proceeds to operation 704, where the scheduler system 122 receives a request to transport the data payload 204 from the content provider 104 to the content requester 106 by time T. From operation 704, the method 700 proceeds to operation 706, where the prediction system 112 identifies the data path(s) that meet connectivity between the content provider and the content requester 106 with delivery by the time T. From operation 706, the method 700 proceeds to operation 708, where the video content mirror 602 transfers the data payload 204 to the content hub$_A$ 604A at the locations 202A. From operation 708, the method 700 proceeds to operation 710, where the content hub$_A$ 604A transfers the data payload 204 to the public transport device$_1$ 110A. From operation 710, the method 700 proceeds to operation 712, where the public transport device$_1$ 110A transports the data payload to the content hub$_B$ 604B at the location$_B$ 202B. From operation 712, the method 700 proceeds to operation 714, where the data courier device$_1$ 108A collects the data payload 204 from the content hub$_B$ 604B. From operation 714, the method 700 proceeds to operation 716, where the data courier device$_1$ 108A travels to the location$_C$ 202C. From operation 716, the method 700 proceeds to operation 718, where the data courier devices 108A transfers the data payload 204 to the content requester 106. From operation 718, the method 700 proceeds to operation 720, where the method 700 ends.

Figure 8:
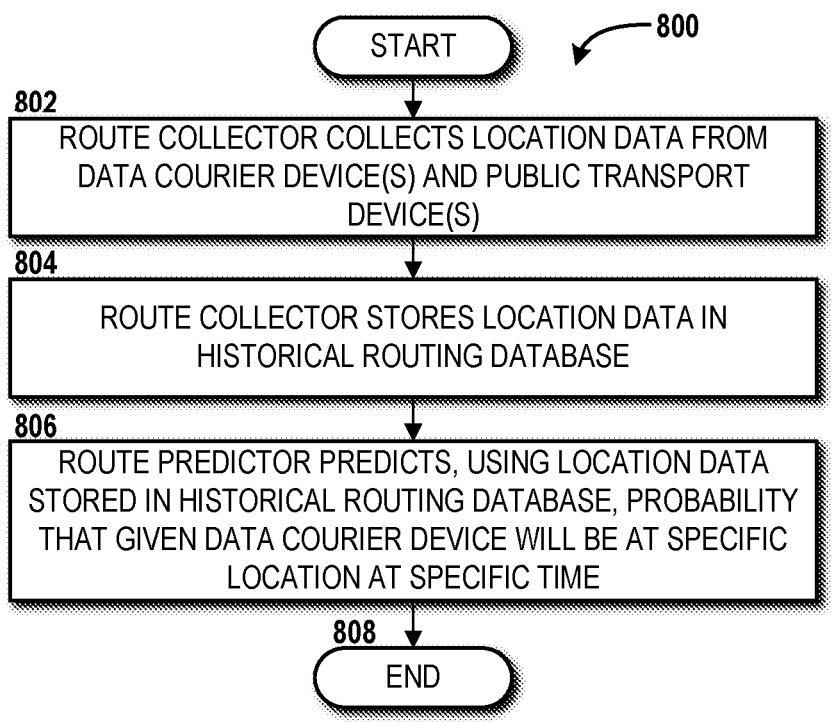
FIG. 8 is a flow diagram illustrating aspects of a method for predicting a probability of devices being in a specific location at a specific time, according to an illustrative embodiment of the concepts and technologies disclosed herein.

Turning now to FIG. 8, a method 800 for predicting the probability of devices being in a specific location at a specific time will be described, according to an illustrative embodiment. The method 800 begins and proceeds to operation 802, where the route collector 114 collects location data from one or more of the data courier devices 108 and/or one or more of the public transport devices 110. From operation 802, the method 800 proceeds to operation 804, where the route collector 114 stores location data in the historical routing database 118. From operation 804, the method 800 proceeds to operation 806, where the route predictor 116 predicts, using the location data stored in the historical routing database 118, a probability that a given data courier device 108 or a given public transport device 110 will be at a specific location at a specific time. From operation 806, the method 800 proceeds to operation 808, where the method 800 ends.

Figure 9:
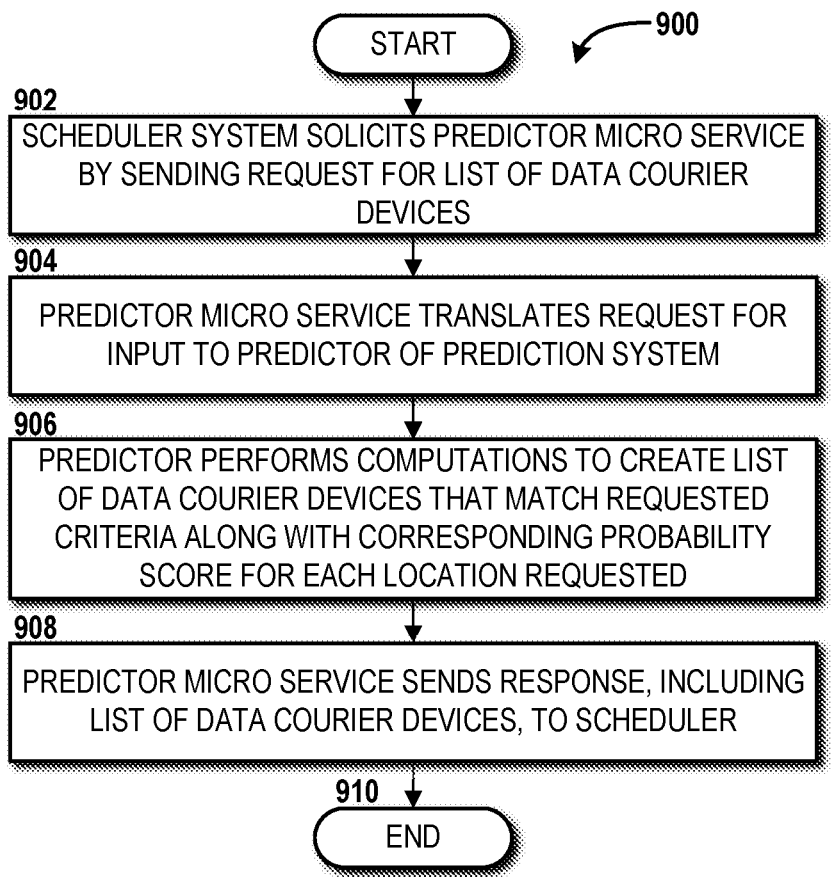
FIG. 9 is a flow diagram illustrating aspects of a method for determining a list of data courier devices, according to an illustrative embodiment of the concepts and technologies disclosed herein.

Turning now to FIG. 9, a method 900 for determining a list of data courier devices 108 will be described, according to an illustrative embodiment. The method 900 begins and proceeds to operation 902, where the scheduler system 122 solicits the prediction micro service 120 by sending the request 124 for a list of data courier devices 108. From operation 902, the method 900 proceeds to operation 904, where the prediction micro service 120 translates the request 124 for input to the route predictor 116. From operation 904, the method 900 proceeds to operation 906, where the route predictor 116 performs computations to create the list of data courier devices 108 that match the requested criteria along with corresponding probability score for each location requested. From operation 906, the method 900 proceeds to operation 908, where the prediction micro service 120 sends the response 126, including the list of data courier devices, to the scheduler system 122. From operation 908, the method 900 proceeds to operation 910, where the method 900 ends.

Figure 10:
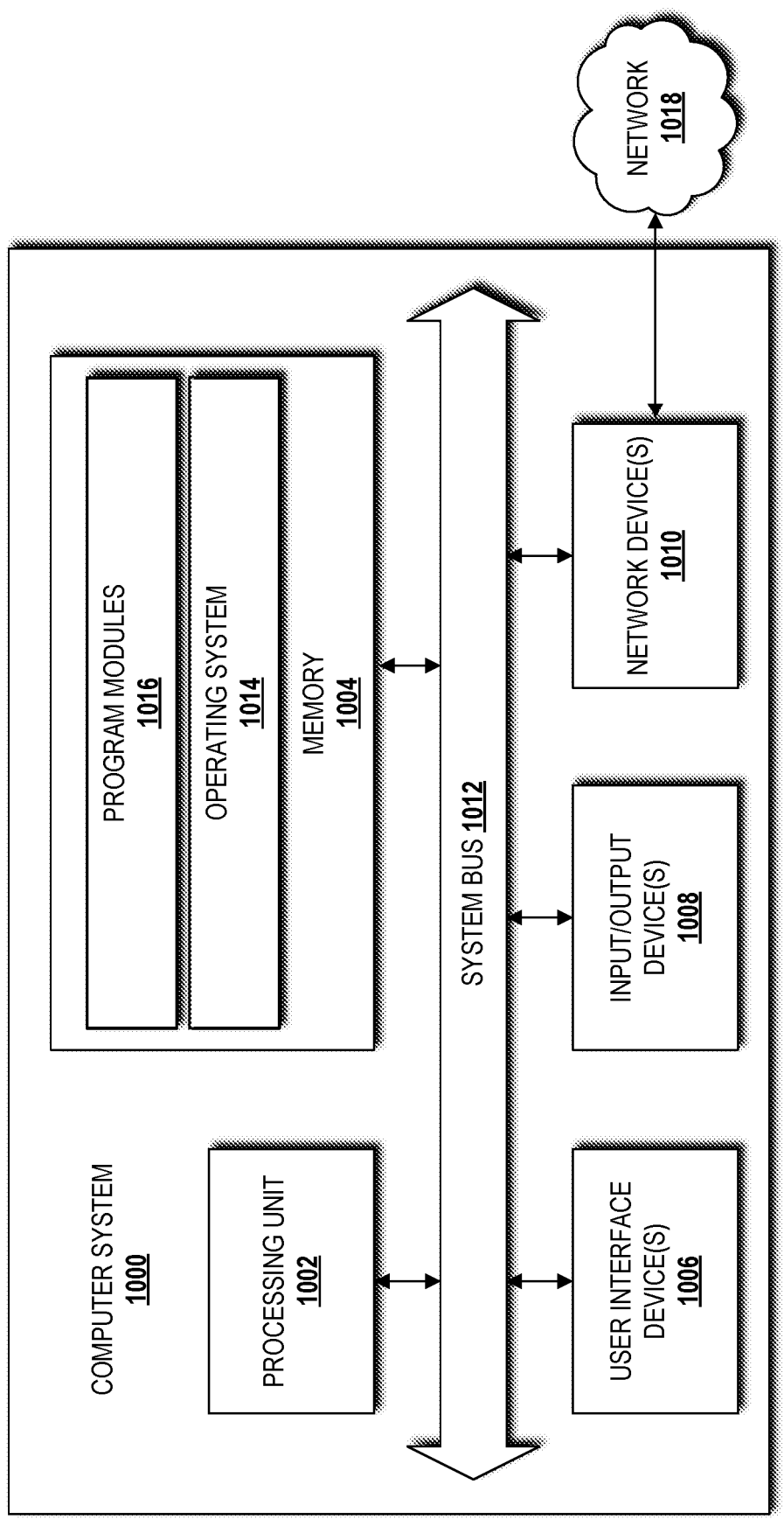
FIG. 10 is a block diagram illustrating an example computer system capable of implementing aspects of the embodiments presented herein.

FIG. 10 is a block diagram illustrating a computer system 1000 configured to provide the functionality in accordance with various embodiments of the concepts and technologies disclosed herein. In some embodiments, the content requester 106, the content provider 104, the data courier device(s) 108, the public transport device(s) 110, the prediction system 112 or components thereof, the scheduler system 122 or components thereof, the video content mirror 602, and/or the content hub(s) 604 can be configured, at least in part, like the architecture of the computer system 1000. It should be understood, however, that modification to the architecture may be made to facilitate certain interactions among elements described herein.

The computer system 1000 includes a processing unit 1002, a memory 1004, one or more user interface devices 1006, one or more input/output ("I/O") devices 1008, and one or more network devices 1010, each of which is operatively connected to a system bus 1012. The bus 1012 enables bi-directional communication between the processing unit 1002, the memory 1004, the user interface devices 1006, the I/O devices 1008, and the network devices 1010.

The processing unit 1002 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 1004 communicates with the processing unit 1002 via the system bus 1012. In some embodiments, the memory 1004 is operatively connected to a memory controller (not shown) that enables communication with the processing unit 1002 via the system bus 1012. The illustrated memory 1004 includes an operating system 1014 and one or more program modules 1016. The operating system 1014 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1016 may include various software and/or program modules to perform the various operations described herein. The program modules 1016 and/or other programs can be embodied in computer-readable media containing instructions that, when executed by the processing unit 1002, perform various operations such as those described herein. According to embodiments, the program modules 1016 may be embodied in hardware, software, firmware, or any combination thereof. In some embodiments, the program modules 1016 can include the route collector 114, the route predictor 116, the historical routing database 118, and/or the prediction micro service 120 of the prediction system 112 configured like the architecture of the computer system 1000. In some embodiments, the program modules 1016 can include the payload manager 134, the scheduler optimizer 136, the device manager 132, the schedule micro service 128, and/or the content micro service 130 of the scheduler system 122 configured like the architectures of the computer system 1000.

By way of example, and not limitation, computer-readable media may include any available computer storage media or communication media that can be accessed by the computer system 1000. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1000. In the claims, the phrase "computer storage medium" and variations thereof does not include waves or signals per se and/or communication media.

The user interface devices 1006 may include one or more devices with which a user accesses the computer system 1000. The user interface devices 1006 may include, but are not limited to, computers, servers, PDAs, cellular phones, or any suitable computing devices. The I/O devices 1008 enable a user to interface with the program modules 1016. In one embodiment, the I/O devices 1008 are operatively connected to an I/O controller (not shown) that enables communication with the processing unit 1002 via the system bus 1012. The I/O devices 1008 may include one or more input devices, such as, but not limited to, a keyboard, a mouse, or an electronic stylus. Further, the I/O devices 1008 may include one or more output devices, such as, but not limited to, a display screen or a printer. In some embodiments, the I/O devices 1008 can be used for manual controls for operations to exercise under certain emergency situations.

The network devices 1010 enable the computer system 1000 to communicate with other networks or remote systems via a network 1018. Examples of the network devices 1010 include, but are not limited to, a modem, a radio frequency ("RF") or infrared ("IR") transceiver, a telephonic interface, a bridge, a router, or a network card. The network 1018 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1018 may be a wired network such as, but not limited to, a Wide Area Network ("WAN"), a wired Personal Area Network ("PAN"), or a wired Metropolitan Area Network ("MAN"). The network 1018 may be any other network described herein.

Figure 11:
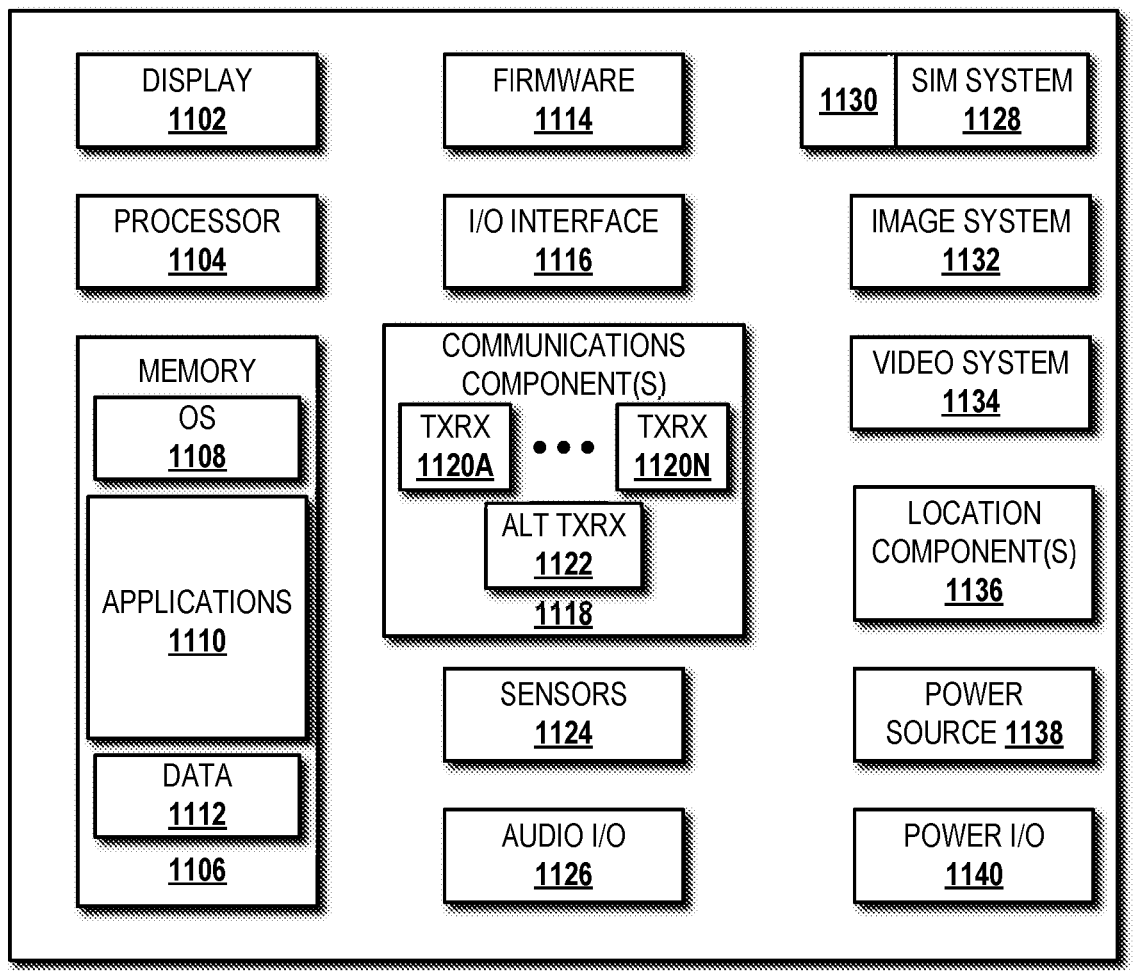
FIG. 11 is a block diagram illustrating an example mobile device capable of implementing aspects of the embodiments disclosed herein.

Turning now to FIG. 11, an illustrative mobile device 1100 and components thereof will be described. In some embodiments, the data courier device(s) 108 is/are configured the same as or similar to the mobile device 1100. While connections are not shown between the various components illustrated in FIG. 11, it should be understood that some, none, or all of the components illustrated in FIG. 11 can be configured to interact with one other to carry out various device functions. In some embodiments, the components are arranged so as to communicate via one or more busses (not shown). Thus, it should be understood that FIG. 11 and the following description are intended to provide a general understanding of a suitable environment in which various aspects of embodiments can be implemented, and should not be construed as being limiting in any way.

As illustrated in FIG. 11, the mobile device 1100 can include a display 1102 for displaying data. According to various embodiments, the display 1102 can be configured to display various GUI elements, text, images, video, virtual keypads and/or keyboards, messaging data, notification messages, metadata, internet content, device status, time, date, calendar data, device preferences, map and location data, combinations thereof, and/or the like. The mobile device 1100 also can include a processor 1104 and a memory or other data storage device ("memory") 1106. The processor 1104 can be configured to process data and/or can execute computer-executable instructions stored in the memory 1106. The computer-executable instructions executed by the processor 1104 can include, for example, an operating system 1108, one or more applications 1110, other computer-executable instructions stored in the memory 1106, or the like. In some embodiments, the applications 1110 also can include a user interface ("UI") application (not illustrated in FIG. 11).

The UI application can interface with the operating system 1108 to facilitate user interaction with functionality and/or data stored at the mobile device 1100 and/or stored elsewhere. In some embodiments, the operating system 1108 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1104 to aid a user in dialing telephone numbers, entering content, viewing account information, answering/initiating calls, entering/deleting data, entering and setting user IDs and passwords for device access, configuring settings, manipulating address book content and/or settings, multimode interaction, interacting with other applications 1110, and otherwise facilitating user interaction with the operating system 1108, the applications 1110, and/or other types or instances of data 1112 (e.g., at least a portion of the content 102, such as the data payload 204) that can be stored at the mobile device 1100. According to various embodiments, the other applications 1110 can include, for example, telephone dialer applications, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1110, the data 1112, and/or portions thereof can be stored in the memory 1106 and/or in a firmware 1114, and can be executed by the processor 1104. The firmware 1114 also can store code for execution during device power up and power down operations. It can be appreciated that the firmware 1114 can be stored in a volatile or non-volatile data storage device including, but not limited to, the memory 1106 and/or a portion thereof.

The mobile device 1100 also can include an input/output ("I/O") interface 1116. The I/O interface 1116 can be configured to support the input/output of data such as location information, user information, organization information, presence status information, user IDs, passwords, and application initiation (start-up) requests. In some embodiments, the I/O interface 1116 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 1100 can be configured to synchronize with another device to transfer content to and/or from the mobile device 1100 (e.g., transferring the data payload 204 between the data courier devices 108). In some embodiments, the mobile device 1100 can be configured to receive updates to one or more of the applications 1110 via the I/O interface 1116, though this is not necessarily the case. In some embodiments, the I/O interface 1116 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1116 may be used for communications between the mobile device 1100 and a network device or local device.

The mobile device 1100 also can include a communications component 1118. The communications component 1118 can be configured to interface with the processor 1104 to facilitate wired and/or wireless communications with one or more networks such as one or more IP access networks and/or one or more circuit access networks. In some embodiments, other networks include networks that utilize noncellular wireless technologies such as WI-FI or WIMAX. In some embodiments, the communications component 1118 includes a multimode communications subsystem for facilitating communications via the cellular network and one or more other networks.

The communications component 1118, in some embodiments, includes one or more transceivers. The one or more transceivers, if included, can be configured to communicate over the same and/or different wireless technology standards with respect to one another. For example, in some embodiments one or more of the transceivers of the communications component 1118 may be configured to communicate using GSM, CDMA ONE, CDMA2000, LTE, and various other 2G, 2.5G, 3G, 4G, 5G, and greater generation technology standards. Moreover, the communications component 1118 may facilitate communications over various channel access methods (which may or may not be used by the aforementioned standards) including, but not limited to, TDMA, FDMA, W-CDMA, OFDM, SDMA, and the like.

In addition, the communications component 1118 may facilitate data communications using GPRS, EDGE, HSPA protocol family including HSDPA, EUL or otherwise termed HSUPA, HSPA+, and various other current and future wireless data access standards. In the illustrated embodiment, the communications component 1118 can include a first transceiver ("TxRx") 1120A that can operate in a first communications mode (e.g., GSM). The communications component 1118 also can include an $N^{th}$ transceiver ("TxRx") 1120N that can operate in a second communications mode relative to the first transceiver 1120A (e.g., UMTS). While two transceivers 1120A-1120N (hereinafter collectively and/or generically referred to as "transceivers 1120") are shown in FIG. 11, it should be appreciated that less than two, two, and/or more than two transceivers 1120 can be included in the communications component 1118.

The communications component 1118 also can include an alternative transceiver ("Alt TxRx") 1122 for supporting other types and/or standards of communications. According to various contemplated embodiments, the alternative transceiver 1122 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 1118 also can facilitate reception from terrestrial radio networks, digital satellite radio networks, internet-based radio service networks, combinations thereof, and the like. The communications component 1118 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1100 also can include one or more sensors 1124. The sensors 1124 can include temperature sensors, light sensors, air quality sensors, movement sensors, orientation sensors, noise sensors, proximity sensors, or the like. As such, it should be understood that the sensors 1124 can include, but are not limited to, accelerometers, magnetometers, gyroscopes, infrared sensors, noise sensors, microphones, combinations thereof, or the like. Additionally, audio capabilities for the mobile device 1100 may be provided by an audio I/O component 1126. The audio I/O component 1126 of the mobile device 1100 can include one or more speakers for the output of audio signals, one or more microphones for the collection and/or input of audio signals, and/or other audio input and/or output devices.

The illustrated mobile device 1100 also can include a subscriber identity module ("SIM") system 1128. The SIM system 1128 can include a universal SIM ("USIM"), a universal integrated circuit card ("UICC") and/or other identity devices. The SIM system 1128 can include and/or can be connected to or inserted into an interface such as a slot interface 1130. In some embodiments, the slot interface 1130 can be configured to accept insertion of other identity cards or modules for accessing various types of networks. Additionally, or alternatively, the slot interface 1130 can be configured to accept multiple subscriber identity cards. Because other devices and/or modules for identifying users and/or the mobile device 1100 are contemplated, it should be understood that these embodiments are illustrative, and should not be construed as being limiting in any way.

The mobile device 1100 also can include an image capture and processing system 1132 ("image system"). The image system 1132 can be configured to capture or otherwise obtain photos, videos, and/or other visual information. As such, the image system 1132 can include cameras, lenses, charge-coupled devices ("CCDs"), combinations thereof, or the like. The mobile device 1100 may also include a video system 1134. The video system 1134 can be configured to capture, process, record, modify, and/or store video content. Photos and videos obtained using the image system 1132 and the video system 1134, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 1100 also can include one or more location components 1136. The location components 1136 can be configured to send and/or receive signals to determine a geographic location of the mobile device 1100. According to various embodiments, the location components 1136 can send and/or receive signals from GPS devices, assisted GPS ("A-GPS") devices, WI-FI/WIMAX and/or cellular network triangulation data, combinations thereof, and the like. The location component 1136 also can be configured to communicate with the communications component 1118 to retrieve triangulation data for determining a location of the mobile device 1100. In some embodiments, the location component 1136 can interface with cellular network nodes, telephone lines, satellites, location transmitters and/or beacons, wireless network transmitters and receivers, combinations thereof, and the like. In some embodiments, the location component 1136 can include and/or can communicate with one or more of the sensors 1124 such as a compass, an accelerometer, and/or a gyroscope to determine the orientation of the mobile device 1100. Using the location component 1136, the mobile device 1100 can generate and/or receive data to identify its geographic location, or to transmit data used by other devices to determine the location of the mobile device 1100. The location component 1136 may include multiple components for determining the location and/or orientation of the mobile device 1100.

The illustrated mobile device 1100 also can include a power source 1138. The power source 1138 can include one or more batteries, power supplies, power cells, and/or other power subsystems including alternating current ("AC") and/or direct current ("DC") power devices. The power source 1138 also can interface with an external power system or charging equipment via a power I/O component 1140.

Because the mobile device 1100 can include additional and/or alternative components, the above embodiment should be understood as being illustrative of one possible operating environment for various embodiments of the concepts and technologies described herein. The described embodiment of the mobile device 1100 is illustrative, and should not be construed as being limiting in any way.

Figure 12:
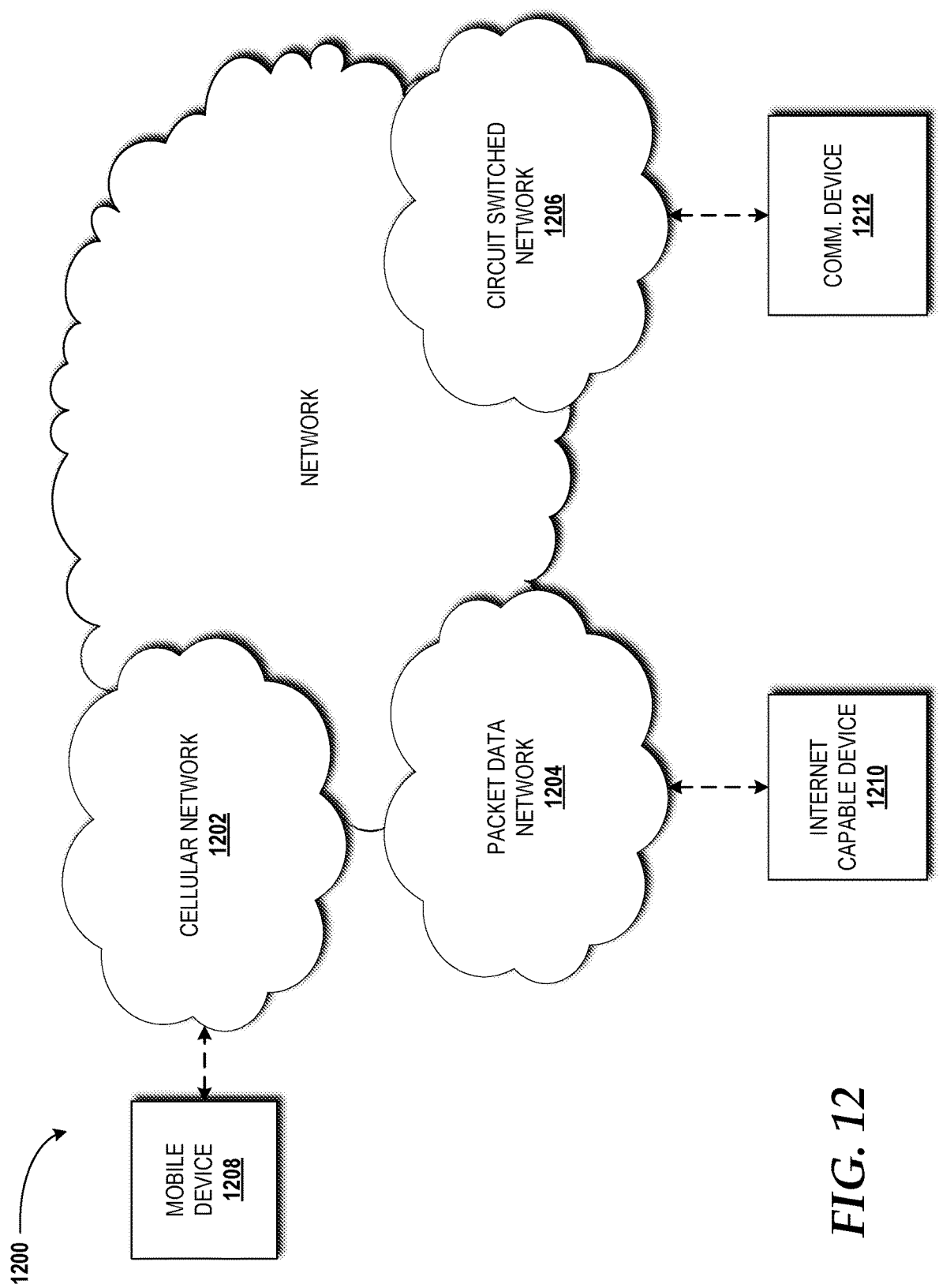
FIG. 12 is a diagram illustrating a network, according to an illustrative embodiment.

Turning now to FIG. 12, details of a network 1200 are illustrated, according to an illustrative embodiment. The network 1200 includes a cellular network 1202, a packet data network 1204, for example, the Internet, and a circuit switched network 1206, for example, a PSTN. The cellular network 1202 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1202 also includes radios and nodes for receiving and transmitting voice, data, and combinations thereof to and from radio transceivers, networks, the packet data network 1204, and the circuit switched network 1206.

A mobile communications device 1208, such as, for example, the data courier device 108, a cellular telephone, a user equipment, a mobile terminal, a PDA, a laptop computer, a handheld computer, and combinations thereof, can be operatively connected to the cellular network 1202. The cellular network 1202 can be configured as a 2G GSM network and can provide data communications via GPRS and/or EDGE. Additionally, or alternatively, the cellular network 1202 can be configured as a 3G UMTS network and can provide data communications via the HSPA protocol family, for example, HSDPA, EUL (also referred to as HSUPA), and HSPA+. The cellular network 1202 also is compatible with 4G mobile communications standards such as LTE, or the like, as well as evolved and future mobile standards.

The packet data network 1204 includes various devices, for example, servers, computers, databases, and other devices in communication with one another, as is generally known. The packet data network 1204 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1204 includes or is in communication with the Internet. The circuit switched network 1206 includes various hardware and software for providing circuit switched communications. The circuit switched network 1206 may include, or may be, what is often referred to as a POTS. The functionality of a circuit switched network 1206 or other circuit-switched network are generally known and will not be described herein in detail.

The illustrated cellular network 1202 is shown in communication with the packet data network 1204 and a circuit switched network 1206, though it should be appreciated that this is not necessarily the case. One or more Internet-capable devices 1210, for example, a PC, a laptop, a portable device, or another suitable device, can communicate with one or more cellular networks 1202, and devices connected thereto, through the packet data network 1204. It also should be appreciated that the Internet-capable device 1210 can communicate with the packet data network 1204 through the circuit switched network 1206, the cellular network 1202, and/or via other networks (not illustrated).

As illustrated, a communications device 1212, for example, a telephone, facsimile machine, modem, computer, or the like, can be in communication with the circuit switched network 1206, and therethrough to the packet data network 1204 and/or the cellular network 1202. It should be appreciated that the commoperation 508unications device 1212 can be an Internet-capable device, and can be substantially similar to the Internet-capable device 1210.

Figure 13:
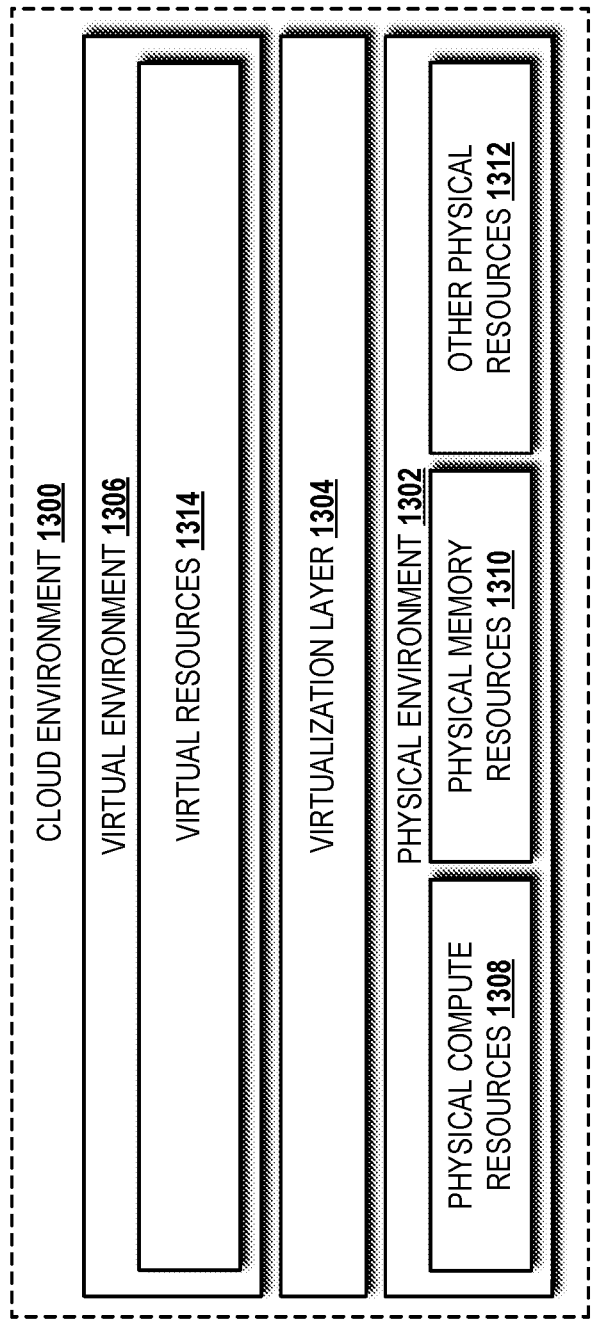
FIG. 13 is a block diagram illustrating aspects of an illustrative cloud environment capable of implementing aspects of the embodiments presented herein.

Turning now to FIG. 13, an illustrative cloud environment 1300 will be described, according to an illustrative embodiment. In some embodiments, the content requester 106, the content provider 104, the data courier device(s) 108, the public transport device(s) 110, the prediction system 112 or components thereof, the scheduler system 122 or components thereof, the video content mirror 602, and/or the content hub(s) 604 can be configured, at least in part, in the cloud environment 1300.

The cloud environment 1300 includes a physical environment 1302, a virtualization layer 1304, and a virtual environment 1306. While no connections are shown in FIG. 13, it should be understood that some, none, or all of the components illustrated in FIG. 13 can be configured to interact with one other to carry out various functions described herein. In some embodiments, the components are arranged so as to communicate via one or more networks. Thus, it should be understood that FIG. 13 and the remaining description are intended to provide a general understanding of a suitable environment in which various aspects of the embodiments described herein can be implemented, and should not be construed as being limiting in any way.

The physical environment 1302 provides hardware resources, which, in the illustrated embodiment, include one or more physical compute resources 1308, one or more physical memory resources 1310, and one or more other physical resources 1312. The physical compute resource(s) 1308 can include one or more hardware components that perform computations to process data and/or to execute computer-executable instructions of one or more application programs, one or more operating systems, and/or other software.

The physical compute resources 1308 can include one or more central processing units ("CPUs") configured with one or more processing cores. The physical compute resources 1308 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 1308 can include one or more discrete GPUs. In some other embodiments, the physical compute resources 1308 can include CPU and GPU components that are configured in accordance with a co-processing CPU/GPU computing model, wherein the sequential part of an application executes on the CPU and the computationally-intensive part is accelerated by the GPU processing capabilities. The physical compute resources 1308 can include one or more system-on-chip ("SoC") components along with one or more other components, including, for example, one or more of the physical memory resources 1310, and/or one or more of the other physical resources 1312. In some embodiments, the physical compute resources 1308 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 1308 can be or can include one or more hardware components architected in accordance with an ARM architecture, available for license from ARM HOLDINGS of Cambridge, United Kingdom. Alternatively, the physical compute resources 1308 can be or can include one or more hardware components architected in accordance with an x86 architecture, such an architecture available from INTEL CORPORATION of Mountain View, Calif., and others. Those skilled in the art will appreciate the implementation of the physical compute resources 1308 can utilize various computation architectures, and as such, the physical compute resources 1308 should not be construed as being limited to any particular computation architecture or combination of computation architectures, including those explicitly disclosed herein.

The physical memory resource(s) 1310 can include one or more hardware components that perform storage/memory operations, including temporary or permanent storage operations. In some embodiments, the physical memory resource(s) 1310 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 1308.

The other physical resource(s) 1312 can include any other hardware resources that can be utilized by the physical compute resources(s) 1308 and/or the physical memory resource(s) 1310 to perform operations described herein. The other physical resource(s) 1312 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 1302 can be virtualized by one or more virtual machine monitors (not shown; also known as "hypervisors") operating within the virtualization layer 1304 to create virtual resources 1314 that reside in the virtual environment 1306. The virtual machine monitors can be or can include software, firmware, and/or hardware that alone or in combination with other software, firmware, and/or hardware, creates and manages virtual resources operating within the virtual environment 1306.

The virtual resources 1314 operating within the virtual environment 1306 can include abstractions of at least a portion of the physical compute resources 1308, the physical memory resources 1310, and/or the other physical resources 1312, or any combination thereof. In some embodiments, the abstractions can include one or more virtual machines upon which one or more applications can be executed.

Based on the foregoing, it should be appreciated that concepts and technologies directed to peer packet transport have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
    receiving, by a schedule micro service executed by a processor of a scheduler system, a content delivery request from a content requester, wherein the content delivery request identifies digital content to be delivered to the content requester at a destination location by a delivery time;
    requesting, by the scheduler system, a list of data courier devices from a prediction micro service executed by a prediction system, wherein the list of data courier devices identifies a plurality of data courier devices, wherein each data courier device of the plurality of data courier devices has a probability of meeting criteria that is greater than a certain percentage, wherein the criteria comprises the data courier device being at a specific location by a specific time;
    receiving, by the scheduler system, the list of data courier devices from the prediction system;
    receiving, by the scheduler system, identification of a data path comprising a plurality of locations in which the plurality of data courier devices are expected to be located based upon the plurality of data courier devices having the probability of meeting the criteria greater than the certain percentage; and
    coordinating, by the scheduler system, among the plurality of data courier devices, physical transport, along the data path, of the digital content to the destination location by the delivery time.

2. The method of claim 1, wherein the digital content is sourced from a content provider in an origin location.

3. The method of claim 2, wherein the plurality of locations comprises the origin location and the destination location.

4. The method of claim 3, wherein, in a location of the plurality of locations, the digital content is transferred from a first entity to a second entity.

5. The method of claim 4, wherein:
the first entity comprises a first data courier device of the plurality of data courier devices; and
the second entity comprises a second data courier device of the plurality of data courier devices.

6. The method of claim 4, wherein:
the first entity comprises the content provider; and
the second entity comprises one of the plurality of data courier devices.

7. The method of claim 4, wherein:
the first entity comprises one data courier device of the plurality of data courier devices; and
the second entity comprises the content requester.

8. The method of claim 4, wherein:
the first entity comprises a content hub; and
the second entity comprises a public transport device.

9. The method of claim 4, wherein:
the first entity comprises a content hub; and
the second entity comprises one data courier device of the plurality of data courier devices.

10. A system comprising:
a processor; and
memory comprising instructions that, when executed by the processor, cause the processor to perform operations comprising
receiving, by a schedule micro service, a content delivery request from a content requester, wherein the content delivery request identifies digital content to be delivered to the content requester at a destination location by a delivery time,
requesting a list of data courier devices from a prediction micro service executed by a prediction system, wherein the list of data courier devices identifies a plurality of data courier devices, wherein each data courier device of the plurality of data courier devices has a probability of meeting criteria that is greater than a certain percentage, wherein the criteria comprises the data courier device being at a specific location by a specific time,
receiving the list of data courier devices from the prediction system,
receiving identification of a data path comprising a plurality of locations in which the plurality of data courier devices are expected to be located based upon the plurality of data courier devices having the probability of meeting the criteria greater than the certain percentage, and
coordinating, among the plurality of data courier devices, physical transport, along the data path, of the digital content to the destination location by the delivery time.

11. The system of claim 10, wherein the digital content is sourced from a content provider in an origin location.

12. The system of claim 11, wherein the plurality of locations comprises the origin location and the destination location.

13. The system of claim 12, wherein, in a location of the plurality of locations, the digital content is transferred from a first entity to a second entity.

14. The system of claim 13, wherein:
the first entity comprises a first data courier device of the plurality of data courier devices; and
the second entity comprises a second data courier device of the plurality of data courier devices.

15. The system of claim 13, wherein:
the first entity comprises the content provider; and
the second entity comprises one data courier device of the plurality of data courier devices.

16. The system of claim 13, wherein:
the first entity comprises one data courier device of the plurality of data courier devices; and
the second entity comprises the content requester.

17. The system of claim 13, wherein:
the first entity comprises a content hub; and
the second entity comprises a public transport device.

18. The system of claim 13, wherein:
the first entity comprises a content hub; and
the second entity comprises one data courier device of the plurality of data courier devices.

19. A computer-readable storage medium comprising computer-executable instructions that, when executed by a processor, cause the processor to perform operations comprising:
receiving, by a schedule micro service, a content delivery request from a content requester, wherein the content delivery request identifies digital content to be delivered to the content requester at a destination location by a delivery time;
requesting a list of data courier devices from a prediction micro service executed by a prediction system, wherein the list of data courier devices identifies a plurality of data courier devices, wherein each data courier device of the plurality of data courier devices has a probability of meeting criteria that is greater than a certain percentage, wherein the criteria comprises the data courier device being at a specific location by a specific time;
receiving the list of data courier devices from the prediction system;
receiving identification of a data path comprising a plurality of locations in which the plurality of data courier devices are expected to be located based upon the plurality of data courier devices having the probability of meeting the criteria greater than the certain percentage; and
coordinating, among the plurality of data courier devices, physical transport, along the data path, of the digital content to the destination location by the delivery time.

20. The computer-readable storage medium of claim 19, wherein the plurality of locations comprises an origin location and the destination location; and wherein, in a location of the plurality of locations, the digital content is transferred from a first entity to a second entity.

* * * * *